United States Patent [19]

Oliver et al.

[11] 3,711,436
[45] Jan. 16, 1973

[54] FLOOR POLISH COMPOSITION HAVING IMPROVED INITIAL WATER AND DETERGENT RESISTANCE

[75] Inventors: Connie J. Oliver; Edward Hinsdale, both of Pittsburgh, Pa. 15219

[73] Assignee: Sinclair-Koppers Co.

[22] Filed: March 2, 1971

[21] Appl. No.: 120,321

[52] U.S. Cl..................260/28.5 R, 260/29.6 RB
[51] Int. Cl............................C08f 45/52, C08f 45/24
[58] Field of Search.................................206/28.5 R

[56] References Cited

UNITED STATES PATENTS

| | | | |
|---|---|---|---|
| 3,403,119 | 9/1968 | Sullivan et al. | 260/28.5 R |
| 3,457,208 | 7/1969 | Sullivan et al. | 260/28.5 R |
| 3,467,610 | 9/1969 | Fiarman et al. | 260/28.5 R |
| 3,554,790 | 1/1971 | Gehman et al. | 260/28.5 R |
| 3,573,239 | 3/1971 | Zclanowski et al. | 260/28.5 R |

*Primary Examiner*—Morris Liebman
*Assistant Examiner*—S. C. Fox
*Attorney*—Lewis J. Young, Oscar B. Brumback and Olin E. Williams

[57] ABSTRACT

An improved aqueous polymer-emulsion floor polish composition containing an aqueous mixture of a wax, an alkali soluble resin, a polymer emulsion, and both a calcium compound dissociable in the composition to form $Ca^{+2}$ ions and a zinc compound dissociable in the composition to form $Zn^{+2}$ ions. These compositions exhibit initial water resistance when applied to a floor as a coating and dried.

7 Claims, No Drawings

FLOOR POLISH COMPOSITION HAVING IMPROVED INITIAL WATER AND DETERGENT RESISTANCE

BACKGROUND OF THE INVENTION

This invention relates to coating compositions and especially to floor polishing compositions which are particularly suitable for applying glossy finishes on wood, rubber, glass, tile, linoleum and the like surfaces. More particularly, this invention relates to such coating compositions having improved initial water and detergent resistance.

Many types of floor polish compositions are known which can be applied to floors to provide, upon drying, a protective coating to the floor. Emulsion floor polish compositions usually include as principal ingredients a water-insoluble emulsion polymer or latex to provide toughness, high gloss, and durability to the coating, and a mixture of a wax and an alkali soluble resin to provide a film forming matrix for the emulsion polymer. The balance of the polish usually includes emulsifying agents, dispersing agents, plasticizers, water and other special purpose additives.

Floor polish compositions to be useful must be capable of being readily removed from the floor when they become dirty or marred after extended use. Aqueous alkaline mediums such as aqueous ammonia solutions are usually effective in removing polish compositions containing alkali soluble resins. In addition to being readily removable in an aqueous alkaline medium, floor polishes must be able to resist being damaged by water or water based detergents. Water is frequently spilled on floors and thus any floor coating must have good water resistance. Further, although after extended use floor coatings need to be removed and replaced with a fresh coating, they preferably are formulated so that they can be washed free of dirt with water based detergents, and must thus possess good detergent resistance. Floor polish compositions which possess both good removability and good water resistance are difficult to formulate.

Freshly applied floor polishes are often subject to damage by water in the first 24 hours after the polish dries. After 24 hours dried polish films generally have good water spot resistance. Drops of water which fall on a freshly polished floor cause objectionable white spots to appear in the dry but new film. Therefore, floor polish additives which cause a floor polish to become water resistant in a short period of time are desired. There are very few known compounds, however, that are capable of making floor polishes resistant to the damaging effects of water soon after application.

One such water resistant floor polish composition contains a polyvalent metal compound that forms a metal complex with the resins and emulsion-polymer in the composition. The metal compound dissociates in the polish to form polyvalent metal ions which then form the complex. Polishes which have been so complexed with metals are generally more resistant to destruction by water and detergent solutions than floor polish compositions which have not been, and thus can be washed more frequently with water based detergents. The most useful of these metal compounds are those that not only form metal complexes but which are also readily solubilized by ammonia for easy removal.

In the past, polishes have been complexed with either zinc alone or with calcium alone to form water resistant floor polishes. One disadvantage of these polish compositions is that the dried floor coatings do not develop initial water resistance; that is, they do not possess a good level of water resistance until after at least about 48 hours. Initial water resistance of these compositions has been improved somewhat by curing the floor polish at 80°C for an extended period of time before it is applied to the floor, but this is not a practical method of achieving initial water resistance.

Summary of the Invention

In accordance with the present invention, it has been found that a floor polish composition having improved initial water resistant properties, can be provided comprising an aqueous mixture of emulsion-polymer, wax, and alkali soluble resin, and both a calcium compound dissociated in the mixture to form $Ca^{+2}$ ions and a zinc compound dissociated in the mixture to form $Zn^{+2}$ ions.

Detailed Description of the Invention

Surprisingly, it has been found that a floor polish composition containing both a calcium complexing compound as well as a zinc complexing compound produces a floor coating having an initial water resistance substantially greater than floor coatings produced from floor polish compositions having solely a calcium or a zinc complexing compound. In fact, the floor compositions of the present invention exhibit good water resistance after only about 24 hours from drying which prevents up to and including 100 percent of the composition from being removed or damaged by water, whereas compositions that contain either solely calcium ions or solely zinc ions are almost completely removed and damaged by water during this same period.

Preferably, based on the weight of resin and emulsion-polymer, the zinc compound comprises from about 0.6 to 6.0 percent by weight of the composition and the calcium compound comprises from about 0.4 to 4.0% by weight of the composition. It is also preferred that the molar ratio of $Zn^{+2}$ ions to $Ca^{+2}$ ions be between about 1 : 4 and 4 : 1. The emulsion-polymer is preferably a styrene-butyl acrylate copolymer or a special blend of a styrene copolymer with a styrene multipolymer. The alkali-soluble resin is preferably a styrene-maleic anhydride copolymer.

It is to be understood that both the foregoing general description and the following detailed description are exemplary and explanatory but are not restrictive of the invention.

In accordance with the invention, the floor polish compositions comprise an aqueous mixture which contains a polyvalent zinc compound and a polyvalent calcium compound both dissociable in the mixture. The amount of each metal compound in the composition can be from 0.4 to 6.0 percent and is preferably about 1.0 to 3.0 percent by weight, based on the weight of alkali soluble resin and emulsion polymer in the composition. The weight of each specific calcium and zinc compound needed to provide an equivalent amount of ions in the composition, of course, varies with the molecular weight of the compound. To impart improved initial water and detergent resistance to the floor polish compositions without deleteriously affecting its other properties, the composition should contain 0.1 to 2.5 millimoles of Ca$^{+2}$ ions per 100 grams of polish, and 0.1 to 2.5 millimoles of Zn$^{+2}$ ions per 100 grams of polish. Preferably, 0.5 to 1.5 millimoles of Ca$^{+2}$ per 100 grams of polish and 0.5 to 1.5 millimoles of Zn$^{+2}$ ions per 100 grams of polish are provided in the composition. A 1 : 1 molar ratio of Zn$^{+2}$ ions to Ca$^{+2}$ ions is generally preferred in the polish composition.

Generally, suitable zinc and calcium compounds that can be used in the composition to provide zinc and calcium ions which form metal complexes within the polish compositions are the oxides, hydroxides, or other basic, acidic, or neutral salts of zinc and calcium. Zinc and calcium compounds which have appreciable solubility in water, such as, at least 1 percent by weight therein, are most useful.

The ammonia and amine complexes of zinc, and especially those containing coordinated NH$_3$ are particularly useful as the zinc compound. Presently, it is preferred to use the zinc-ammonia complex Zn(NH$_3$)$_4$O$_3$ as the zinc compound for providing the zinc ions in the floor polish composition. Exemplary of other zinc compounds that can be used are ZnCO$_3$, ZnO, and Zn(OH)$_2$. It is also preferred to use calcium carbonate as the calcium compound which provides the calcium ions in the floor polish composition. Exemplary of other specific calcium compounds that can be used are calcium hydroxide, and calcium oxide.

In accordance with the invention, the floor polish compositions contain an aqueous polymer emulsion or latex. The term polymer emulsion is intended to include copolymers as well. The latices are derived from ethylenically unsaturated monomers and include emulsions containing polystyrene, polyvinyl chloride and polyacrylic resins, as well as blends of polystyrene-polyacrylic resins, and complex styrene-acrylic copolymers.

When used in the floor polish composition, the aqueous polymer emulsion usually contains 10 to 20 percent polymer, based on the weight of the polymer emulsion. The polymer or solids content of the aqueous emulsion polymer usually comprises 50 to 80 percent by weight of the total solids present in the polish compositions and normally is the major solid constituent present in the polish composition.

Generally, the total solids content of the floor polish composition ranges from about 5 to about 30 percent by weight of the composition. The preferred total solids content of the polish for producing ease of application is from about 10 to about 20 percent. The remainder of the composition is generally aqueous and usually is water.

Preferably, the latex portion of the floor polish composition is either a low pH styrene-butyl acrylate copolymer or a blend of specific styrene polymers. The styrene-butyl acrylate copolymers are emulsion polymers comprised of 30 to 50 percent styrene, 20 to 55 percent butyl acrylate, and 15 to 30 percent of ethylenically unsaturated monomers such as methacrylic acid and acrylonitrile. A particularly useful styrene-butyl acrylate copolymer is a copolymer prepared from styrene, butyl acrylate, methacrylic acid and acrylonitrile in the ratio of 38:37:10:15 parts by weight, which can be prepared by conventional emulsion polymerization techniques.

The preferred blend of styrene polymers consists essentially of 50 to 80 percent by weight of a styrene copolymer, and 50 to 20 percent by weight of a styrene multi-polymer.

The styrene copolymer of the preferred blend is an emulsion polymer comprised of 90 – 95 percent styrene and 10 – 5 percent of an ethylenically unsaturated monocarboxylic acid selected from acrylic and methacrylic acid. This copolymer is generally termed a hard polymer because of its brittle properties and although forming a tough film, is subject to crazing or cracking if used alone in floor polishes. When employed in polishes, significant amounts of plasticizers are needed to reduce the brittle character of this copolymer.

The specially prepared styrene emulsion multipolymer of the blend consists of a polymer formed from 10 – 40% styrene and 90 – 60 percent of a mixture of ethylenically unsaturated monomers. The ethylenically unsaturated monomers are all of the general formula:

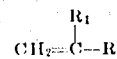

wherein R is —COOH; or R is —COOR$_2$, wherein R$_2$ is an alkyl group having 1–8 carbon atoms; or R is C ≡ N; and R$_1$ is selected from hydrogen and a methyl group.

Preferably, the mixture of ethylenically unsaturated monomers used to form the multi-polymer has certain percentages of the various ethylenically unsaturated monomers. Thus, the mixture of ethylenically unsaturated monomers used to form the multi-polymer contains, based on the multi-polymer, from 1 to 10% by weight of the ethylenically unsaturated monomer wherein R is —COOH, such as acrylic acid or methacrylic acid. From about 30 – 80 percent of the mixture is an ethylenically unsaturated monomer wherein R is —COOR$_2$, with R$_2$ being an alkyl group of from one to eight carbon atoms, such as ethyl acrylate, 2-ethylhexyl acrylate, butyl acrylate, ethyl methacrylate and the like. The remaining monomer, acrylonitrile, or methacrylonitrile is present in about 5–25 percent. A blend containing the described styrene multipolymer exhibits a resistance to plasticizer migration from the flooring into the floor polish coating.

The emulsion polymers useful in the present invention are readily prepared from the desired monomers by conventional aqueous emulsion polymerization procedures. Preferably, the monomers are premixed, the catalyst is premixed to form an aqueous solution or slurry and these two premixes added to an aqueous charge in a reactor. The catalyst premix comprises water, catalyst, dispersants, and emulsifying agents. Conventional polymerization catalysts or mixtures thereof including potassium persulfate, benzoyl peroxide, azobisisobutyronitrile and the like. The catalysts are generally used in about 0.01 – 1.0 part per 100 parts by weight of total monomers.

Conventional emulsifying agents such as alkali metal salts of long chain alkyl sulfates and sulfonates, ethylene oxide condensates of long chain fatty acids, alcohols or mercaptans, sodium salts of sulfonated hydrocarbons, alkyl arylsulfonates and the like are usable. Representative emulsifying agents include such compounds as sodium lauryl sulfate, sulfosuccinate acid esters, sodium salts of bioctyl sulfosuccinate acid, sodium salts of sulfonated cetyl alcohol, sodium pyrophosphate and alkyl aryl polyether alcohol.

When forming the emulsion polymers of the preferred blend, the polymerizations are carried out under acidic conditions and the aqueous emulsion polymer pH raised to a pH of about 8-10, following the polymerization, with inorganic or organic bases such as sodium hydroxide, ammonium hydroxide, potassium hydroxide, monoethanolamine, and the like. When forming the preferred styrene-butyl acrylate copolymer the polymerization is carried out under acidic conditions and the aqueous emulsion polymer pH raised to a pH of about 8.0 to 9.0, following the polymerization with inorganic or organic bases such as ammonia, 3-methoxy-N-propylamine, and morpholine. The water content of the aqueous polymerization system is generally such that between about 30–55 percent solids are present during the polymerization, with the amount increased or decreased as desired.

In accordance with the invention, the floor polish compositions of the present invention usually contain alkali-soluble resins. Examples of suitable alkali-soluble resins are rosin acid, maleate-modified rosin acid ester, shellac, styrene-maleic anhydride copolymers, polyesters or alkali soluble alkyds, pentaerythritol ester of rosin, manilla gum, Loba gum and the like. The alkali soluble resins are usually added to the floor polish composition as an aqueous emulsion containing 10–20 percent resin based on the weight of the emulsion. The resin usually comprises 10 to 30 percent by weight of the total solids present in the polish composition.

Preferred alkali-soluble resins for use in the present invention are styrene-maleic anhydride copolymers which contain styrene copolymerized with maleic anhydride in a molar ratio between about 1:1 and about 3:1. These materials are commercially available. The materials, which contain acid anhydride groups, have a molecular weight between about 700 and about 2,500, usually between about 1,600 and about 2,200, and contain on the average about 8 repeating units each comprising a maleic anhydride group and one, two, or three styrene molecules in conjunction therewith. For example, one such copolymer has a molecular weight of 1,900 and an acid number of 275. These polymeric acid anhydride materials are solids whose melting points vary from about 140°C to about 180°C, and are water-insoluble materials.

In accordance with the present invention, the floor polish compositions contain a waxy material. Suitable waxes, which are generally added as about a 10–20 percent by weight aqueous emulsion, are the animal, vegetable and synthetic waxes such as carnauba, polyethylene, polypropylene, oxidized microcrystalline paraffin wax, beeswax, montan, and the like. For addition to floor polish compositions, these waxes are dispersed in water with surface active agents such as sorbitol condensate adducts, polyglycol ether products, alkali or amine salts of fatty acids, sulfates, and sulfonates. The waxes usually comprise 5 to 20 percent by weight of the total solids present in the polish composition.

Preferred waxes for use in the present invention are polyethylene waxes. A typical polyethylene wax emulsion can be formed at a 13 percent solids content from an AC-629 polyethylene, a well known low molecular weight polyethylene wax having a melting point of 213°–221°F and manufactured by the Allied Chemical Corporation, New York, New York.

In addition, optional minor ingredients conventionally used in floor polish compositions can be incorporated in the compositions of the present invention. Exemplary of the optional ingredients that can be added are leveling or coalescing agents. Leveling or coalescing agents usually comprise about 0.5–1 percent by weight of the total polish and include tributoxyethyl phosphate, triethyl phosphate, tributyl phosphate, tricresyl phosphate, triphenyl phosphate, diethylene glycol monomethyl ether, diethylene glycol monoethyl ether and the like.

To form the polish compositions of the present invention, the emulsion polymer, plasticizers, dispersing agents or coalescing agents, other optional ingredients, the alkali soluble resin in aqueous emulsion form, and the wax in aqueous emulsion form are all mixed together. The polymer emulsion, wax emulsion and alkali soluble resin emulsion can be mixed in any order desired. The polymer emulsion is usually preplasticized with plasticizing agents such as tributoxyethyl phosphate, dibutyl phthalate and diethylene glycol monomethyl ether. Preferably, the resin is added to the preplasticized polymer emulsion, followed by addition of the wax emulsion, and optional minor ingredients such as leveling agents. The polish is then usually mixed for a minimum period of two hours to achieve the final polish blend.

The polyvalent metal compounds used in the present invention can be incorporated into the composition at any time. Preferably, however, the zinc compound is added to the composition after the emulsion polymer and resin have been mixed together, but before the addition of the wax. The calcium compound is preferably added to the emulsion polymer and mixed into the latex portion for several hours until a uniform appearance is obtained before the emulsion polymer is preplasticized. The metal compounds are usually added in incremental amounts to aid their solvation in the composition.

For a clearer understanding of the invention, specific examples of it are set forth below. These examples are merely illustrative of this invention and are not to be understood as limiting the scope and underlying principles of the invention in any way. All percentages and parts referred to herein are by weight unless otherwise specifically indicated.

EXAMPLE I

In this example a floor polish composition is made according to the teachings of the present invention. A styrene copolymer emulsion (emulsion A) is prepared using conventional emulsion polymerization procedure to produce a copolymer containing 95 parts styrene and 5 parts acrylic acid.

A styrene multi-polymer emulsion (emulsion B) is prepared by conventional emulsion polymerization having the following composition:

| | |
|---|---|
| Styrene | 14 parts |
| Ethyl Acrylate | 65 parts |
| Acrylonitrile | 20 parts |
| Acrylic Acid | 1 part |

Both copolymer emulsions were adjusted to a solids content of 13 percent by weight with water.

A polish composition was then prepared by combining 36.5 parts of emulsion A; 36.5 parts of emulsion B; 15.5 parts of a water soluble styrene-maleic anhydride copolymer resin sold under the trade name "SMA 3,000A" available from Texas Butadiene and Chemical Corporation; 11.5 parts of a polyethylene wax emulsion (AC–629, a low molecular weight polyethylene wax, m.p. 213°–221°F, 13 percent solids); 0.8 parts of tributoxyethyl phosphate, 1.5 diethylene glycol monomethyl ether, and 0.3 parts dibutyl phthalate as plasticizer; 1.0 parts FC–128, at 1 percent solids, as a leveling aid, available from Minnesota Mining and Manufacturing Company; and 0.8 parts Igepal CO–990, at 10 percent solids, as a leveling aid, available from General Aniline and Film Corp.

The polish composition has a total solids content of 13.0 percent and a pH of 8.5.

Also incorporated in this floor polish composition in accordance with the invention is 0.10 parts of $CaCO_3$ as the calcium compound, and 0.18 parts of the zinc ammonia complex $Zn(NH_3)_4CO_3$ as the zinc compound. The $CaCO_3$ is added to a mixture of emulsion A with emulsion B, and the $Zn(NH_3)_4CO_3$ is added to the composition after plasticizers and resin are admixed with the emulsion polymer mixture.

EXAMPLE II

The floor polish composition of Example I (Composition 1) containing both the zinc compound and the calcium compound is compared to two floor polish compositions that were prepared in an identical manner to the composition of Example I except that one of these compositions (Composition 2) had only the zinc compound in an amount equivalent to the total metal compound concentration of Example I added to it, and the other floor polish composition (Composition 3) had only the calcium compound in an amount equivalent to the total metal compound concentration of Example I added to it. These three compositions were tested for initial detergent resistance and removability.

An 0.8 c.c. sample of each of the floor polish compositions is applied to a 9 inch × 9 inch solid vinyl tile and spread over a 2 inch × 8 inch area via a doctor blade set at 0.008 inch. The tile is then scrubbed with a Gardner scrub machine with a brush that is covered with a cheesecloth pad that has been soaked for one minute in 10 mls. of Spic and Span. The test is run 24 hours after the floor polish is applied to the vinyl tile to determine its level of initial detergent resistance. The dried floor polish is scrubbed for 35 cycles and the amount of polish removed is determined by visual inspection. Table I below shows the percent of film removed for each of these compositions.

TABLE I

EVALUATION OF INITIAL DETERGENT RESISTANCE AFTER 24 HOURS ON TILE

| Composition no. | Metal Compounds in composition | Percent of film removed |
| --- | --- | --- |
| 1 | Zn and Ca | very little |
| 2 | Zn | all |
| 3 | Ca | substantially all |

As seen from Table I, Composition No. 1 of Example I which is prepared in accordance with the teachings of the present invention is barely removed, whereas the compositions containing calcium compounds or zinc compounds solely are substantially completely removed by the scrub test. Thus, compositions containing an addition of both calcium compounds and zinc compounds provide improved initial detergent resistance.

To further test the compositions for their initial detergent resistance, each of the above three floor polish compositions are placed in a glass bottle which is then capped and stored in an electric oven maintained at 80°C. The compositions are cured in the oven for 24 hours, removed, and then tested for initial detergent resistance in an identical manner as that used above. The results of this test are set forth in Table II below.

TABLE II

EVALUATION OF INITIAL DETERGENT RESISTANCE OF CURED POLISH COMPOSITIONS AFTER 24 HOURS ON TILE

| Composition No. | Metal compounds in composition | Percent of film removal |
| --- | --- | --- |
| 1 | Zn and Ca | 0 |
| 2 | Zn | 10 |
| 3 | Ca | 50 |

As can be seen from a comparison of Tables I and II, curing the floor polish compositions markedly increases the initial detergent resistance of compositions having solely a zinc compound or solely a calcium compound added thereto, whereas curing brings about only a small increase in the composition having both a calcium and zinc compound added thereto. Importantly, the uncured composition of the present invention has a greater initial detergent resistance than cured compositions not containing both the calcium and zinc addition of the present invention.

The cured and uncured floor polish compositions are also tested to determine their removability. The same procedure and apparatus that were used to determine initial detergent resistance is used for determining removability except that the Spic and Span solution is ammoniated.

The removability test is conducted 24 hours after the polishes are applied to the tile. The results of the removability test after 50 cycles of scrubbing are set forth in Table III below.

TABLE III

EVALUATION OF REMOVABILITY OF POLISH COMPOSITIONS AFTER 24 HOURS ON TILE

| Composition No. | Metal compound in Composition | Percent of film Removed |
|---|---|---|
| 1 (uncured) | Zn and Ca | all |
| 1 (cured) | Zn and Ca | substantially all |
| 2 (uncured) | Zn | all |
| 2 (cured) | Zn | all |
| 3 (uncured) | Ca | all |
| 3 (cured) | Ca | all |

EXAMPLE III

In this example a floor polish composition is made according to the teachings of the present invention in a manner identical to Example I except that the blend of styrene copolymer and styrene multipolymer as the latex portion of the floor polish is replaced by 73 parts of a styrene, butyl acrylate, methacrylic acid, acrylonitrile copolymer having a weight ratio of 38:37:10:15, respectively. The zinc and calcium compounds are added as described in Example I.

EXAMPLE IV

The floor polish composition of Example III (Composition 4) is compared to two floor polish compositions that were prepared in an identical manner to the composition of Example III except that one of these compositions (Composition 5) had only the zinc compound added to it, and the other floor polish compositions (Composition 6) had only the calcium compound added to it. The initial detergent resistance and removability tests of Example II were run on uncured and cured samples of Composition Nos. 4, 5, and 6. The results of these tests are set forth in Table IV below.

TABLE IV

EVALUATION OF INITIAL DETERGENT RESISTANCE AND REMOVABILITY AFTER 24 HOURS ON TILE

| Composition No. | Metal Compound in Composition | Initial Detergent Resistance—% of film Removed | Removability—% of film Removed |
|---|---|---|---|
| 4 (uncured) | Zn and Ca | 5 | 100 |
| 4 (cured) | Zn and Ca | | |
| 5 (uncured) | Zn | 97 | 100 |
| 5 (cured) | Zn | 5 | 100 |
| 6 (uncured) | Ca | 97 | 100 |
| 6 (cured) | Ca | 10 | 100 |

As can be seen from this table, the uncured floor polish composition having an addition of both calcium and zinc compounds exhibit improved initial detergent resistance, while the uncured compositions containing only one of these metal compounds exhibit practically no initial detergent resistance.

The invention in its broader aspects is not limited to the specific details shown and described and departures may be made from such details without departing from the principles of the invention and without sacrificing its chief advantages.

What is claimed is:

1. An improved aqueous polymer-emulsion floor polish composition comprising, in combination, an aqueous mixture of:
   a. 5–20 percent by weight based on total solids of a wax;
   b. 10–30 percent by weight based on total solids of an alkali-soluble resin;
   c. 50–80 percent by weight based on total solids of an emulsion polymer comprising a blend of styrene polymers consisting of an admixture of:
      1. 50–80 percent by weight of a styrene copolymer consisting of 90–95 percent by weight of the copolymer of styrene and 5-10% by weight of an ethylenically unsaturated monocarboxylic acid selected from acrylic and methacrylic acid; and
      2. 50–20 percent by weight of a styrene multi-polymer consisting of 10–40 percent by weight of styrene and 90–60 percent by weight of a mixture of ethylenically unsaturated monomers of the formula:

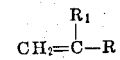

wherein R is —COOH; —COOR$_2$, wherein R$_2$ is an alkyl group having 1–8 carbon atoms; or —C ≡ N, and R$_1$ is hydrogen or methyl, said styrene multi-polymer containing from 1–10 percent by weight of said monomer wherein R is —COOH, 30–80 percent of said monomer wherein R is —COOR$_2$, and 5–25 percent of said monomer wherein R is —C ≡ N;

d. 0.4 – 4.0 percent by weight based on the weight of resin and emulsion polymer of a calcium compound dissociated in the mixture to form Ca$^{+2}$ ions; and
   e. 0.6 – 6.0 percent by weight based on the weight of resin and emulsion polymer of a zinc compound dissociated in the mixture to form Zn$^{+2}$ ions; said calcium and zinc compounds being present in amounts such that the molar ratio Zn$^{+2}$ to Ca$^{+2}$ ions is between 1:4 and 4:1 and said composition having a total solids content of between 5 and 30 percent by weight of total mixture.

2. The composition of Claim 1 wherein the molar ratio of Zn$^{+2}$ ions to Ca$^{+2}$ ions is about 1:1.

3. The composition of claim 1 wherein the said copolymer consists of about 95 percent styrene and about 5 percent acrylic acid, and said multipolymer consists of about 14 percent styrene, about 65 percent ethyl acrylate, about 1 percent acrylic acid, and about 20 percent acrylonitrile.

4. The composition of claim 1 wherein the emulsion polymer comprises a styrene-butyl acrylate copolymer.

5. The composition of claim 4 wherein the styrene-butyl acrylate copolymer comprises 30 to 50 percent styrene, 20 to 55 percent butyl acrylate, and 15 to 30 percent ethylenically unsaturated monomers selected from the group consisting of acrylic acid, methacrylic acid, acrylonitrile, and methacrylonitrile.

6. The composition of claim 4 wherein the styrene-butyl acrylate copolymer consists of 38 percent styrene, 37 percent butyl acrylate, 10 percent methacrylic acid, and 15 percent acrylonitrile.

7. The composition of claim 1 wherein the alkali soluble resin is a styrene-maleic anhydride copolymer.

* * * * *